US006450742B1

(12) United States Patent
Jenkins et al.

(10) Patent No.: US 6,450,742 B1
(45) Date of Patent: Sep. 17, 2002

(54) LOADING AND UNLOADING DEVICE TRANSPORTING VEHICLES

(76) Inventors: John M. Jenkins, P.O. Box 346, Brown Summit, NC (US) 27214; Ed Wilson, 18081 Leesville Rd., Evington, VA (US) 24550

( * ) Notice: Subject to any disclaimer, the term of this patent is extended or adjusted under 35 U.S.C. 154(b) by 2 days.

(21) Appl. No.: 09/741,250

(22) Filed: Dec. 21, 2000

(51) Int. Cl.[7] .................................................. B60P 7/00
(52) U.S. Cl. ........................... 410/29.1; 410/24; 410/26
(58) Field of Search ........................... 410/24, 26, 29.1; 414/546, 563, 430, 495; 280/402

(56) References Cited

U.S. PATENT DOCUMENTS

| | | | | |
|---|---|---|---|---|
| 3,913,496 A | * | 10/1975 | Lohr | 410/27 |
| 4,749,317 A | * | 6/1988 | Daniel | 410/26 |
| 4,750,856 A | * | 6/1988 | Lapiolahti | 410/29.1 X |
| 4,795,303 A | * | 1/1989 | Bubik | 410/29.1 X |
| 5,213,458 A | * | 5/1993 | Preller et al. | 410/26 |
| 5,676,507 A | * | 10/1997 | Lugo | 410/29.1 |
| 5,755,540 A | * | 5/1998 | Bushnell | 410/29.1 |
| 6,345,943 B1 | * | 2/2002 | Lawson et al. | 410/29.1 |

* cited by examiner

Primary Examiner—Stephen T. Gordon

(57) ABSTRACT

A loading and unloading device for transporting vehicles with the use of a truck which is movably and releasably secured to the bed of the truck. The device has a movable vehicle receiving floor with forward and rearward legs pivotally secured to the bed so that the receiving floor can be displaced forwardly and upwardly to lift and carry a vehicle at a height sufficient to permit the placement of another vehicle on the truck bed and beneath the floor. A power cylinder, preferably one or more hydraulic cylinders, is used to selectively raise the receiving floor and carried vehicle upwardly and forwardly of the bed so that the weight of the car is more evenly distributed over the truck. The elevated vehicle is positioned more near the front wheels and axle of the truck to enable better truck handling and control. The configuration of the receiving floor, the truck bed and the pivotally secured legs always forms a parallelogram so that the vehicle being raised is substantially level at all times. The device does not interfere with the towing of a third automobile thus enabling the transportation by a single vehicle of three other vehicles such as automobiles.

16 Claims, 11 Drawing Sheets

LOADING AND UNLOADING DEVICE TRANSPORTING VEHICLES

BACKGROUND OF THE INVENTION

1. Field of the Invention

The present invention relates generally to the field of automobile transport devices and vehicles, and more particularly, but not by way of limitation, to a loading and unloading device for transporting vehicles with the use of a truck wherein up to three vehicles can be transported by a single truck.

2. Brief Description of the Prior Art

The prior art is replete with vehicles and trailers for transporting various types of vehicles ranging from single automobile carrying vehicles to multiple carrying vehicles usually associated with the transportation of new automobiles that utilize specially constructed trailers to hold up to ten vehicles.

For smaller trucks to transport automobiles for any distance, only two vehicles can usually be transported. One may be positioned on the bed of the truck and the other towed or trailered.

Some multi-unit devices have been developed so that more than one vehicle can be accommodated in a single storage area. See for example U.S. No. 4,749,317 disclosing a trailer for transporting and storing recreational vehicles. Note FIGS. 9–12 showing the placement of one vehicle on a movable upper rack that, when stored, permits one or more additional units to be placed beneath it.

Automobile transportation for more than nominal distances is an important business today, and it is most desirable that as many automobiles as possible be moved during a single delivery. It is to this particular need that the present invention is directed.

SUMMARY OF THE INVENTION

A loading, transporting and unloading device for vehicles such as automobiles in association preferably with a hydraulic roll back truck is provided by this invention. The device includes a receiving floor having pivotally secured front and rearward legs for movable and releasable attachment to the bed of the truck of a size suitable to accommodate at least one automobile on the floor in the transport condition. The floor is connected to a conventional roll back truck by the legs so it can rest upon the truck bed in the inactive condition and lie substantially parallel thereto. Forward supporting legs and rearward supporting legs are pivotally secured to the truck bed and the receiving floor, and suitable cylinder means engages the bed and forward legs to displace the floor upwardly and forwardly to the raised position. Power cylinders of the hydraulic type are quite suitable for use in this floor raising structure. The floor when raised moves upwardly and partially forwardly of the bed front end to a height sufficient to accommodate the placement of a vehicle on the ramp beneath the floor. An automobile to be carried by the floor is placed on the floor while it is in the lowered condition and the truck bed is in the inclined or roll back position. When the floor is moved upwardly and forwardly by the hydraulic cylinders, the weight of the car is placed substantially along the forward end of the truck near the front axle so that secure truck control is accomplished by the weight distribution. The configuration of the bed, floor, and support legs at all times during raising, transporting and lowering is a parallelogram. This configuration ensures substantially level positioning of the floor-carried vehicle at all times except when it is being loaded or unloaded.

From the foregoing summary, it can be seen that an objective of the present invention is to provide a loading, transporting and unloading device for motor vehicles that has all of the advantages of prior art devices and more and none of the disadvantages.

Another objective of the present invention is to provide a device of the type described that will maximize the number of automobiles transported by a single vehicle of moderate size.

Yet another objective of the present invention is to provide a device of the type described that will more evenly distribute the weight of the carried load over the chassis of the truck.

Yet another objective of the present invention is to provide a device of the type described that will enable the separate construction of the device remote from the carrying truck that can be thereafter installed, replaced or removed for repairs.

A further objective of the present invention is to provide a device of the type described that is dramatically less expensive to produce than other multiple vehicle carrying trucks.

The summary and objectives focus on the more important features of the invention in order that the detailed description that follows may be better understood and that the present contribution to the art may be better appreciate. There are, of course, additional features of the invention that will be described hereinafter and which will form the subject matter of the claims appended hereto. It is to be understood that the invention is not limited to the details of construction and to the arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is also to be understood that the abstract is neither intended to define the invention of the application, which is measured by its claims, nor to limit its scope in any way.

This summary and the objects of the invention set forth above, along with the various features which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE PREFERRED EMBODIMENT

Figure 1:
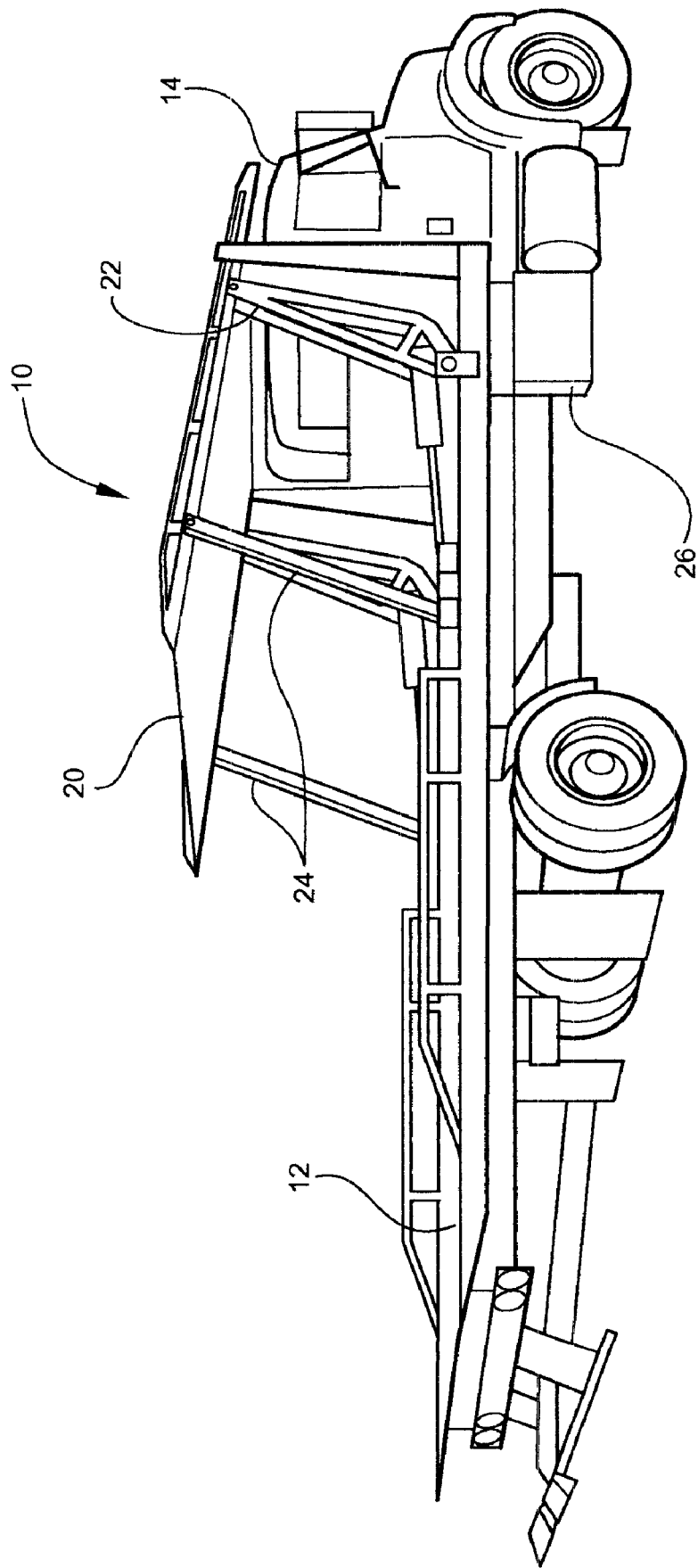
FIG. 1 is a perspective view of the vehicle loading, transporting and unloading device made in accordance with the present invention showing the vehicle-receiving floor in the raised condition.
Figure 8:
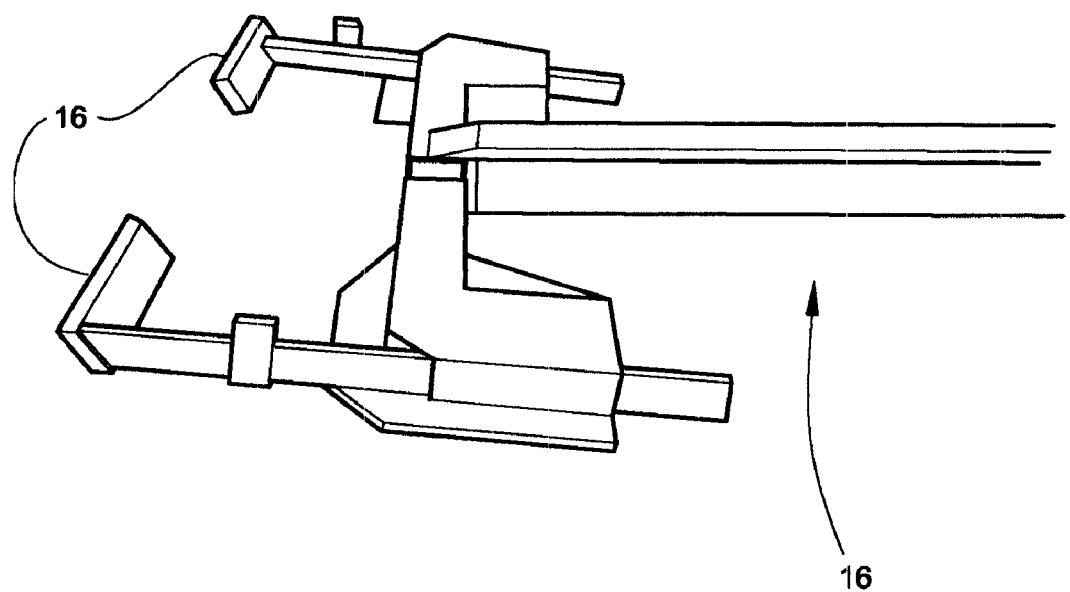
FIG. 8 is a fragmentary, perspective view of the support structure carrying the receiving floor which is mounted on the bed of the truck including vehicle stop members positioned thereon.
Figure 9:
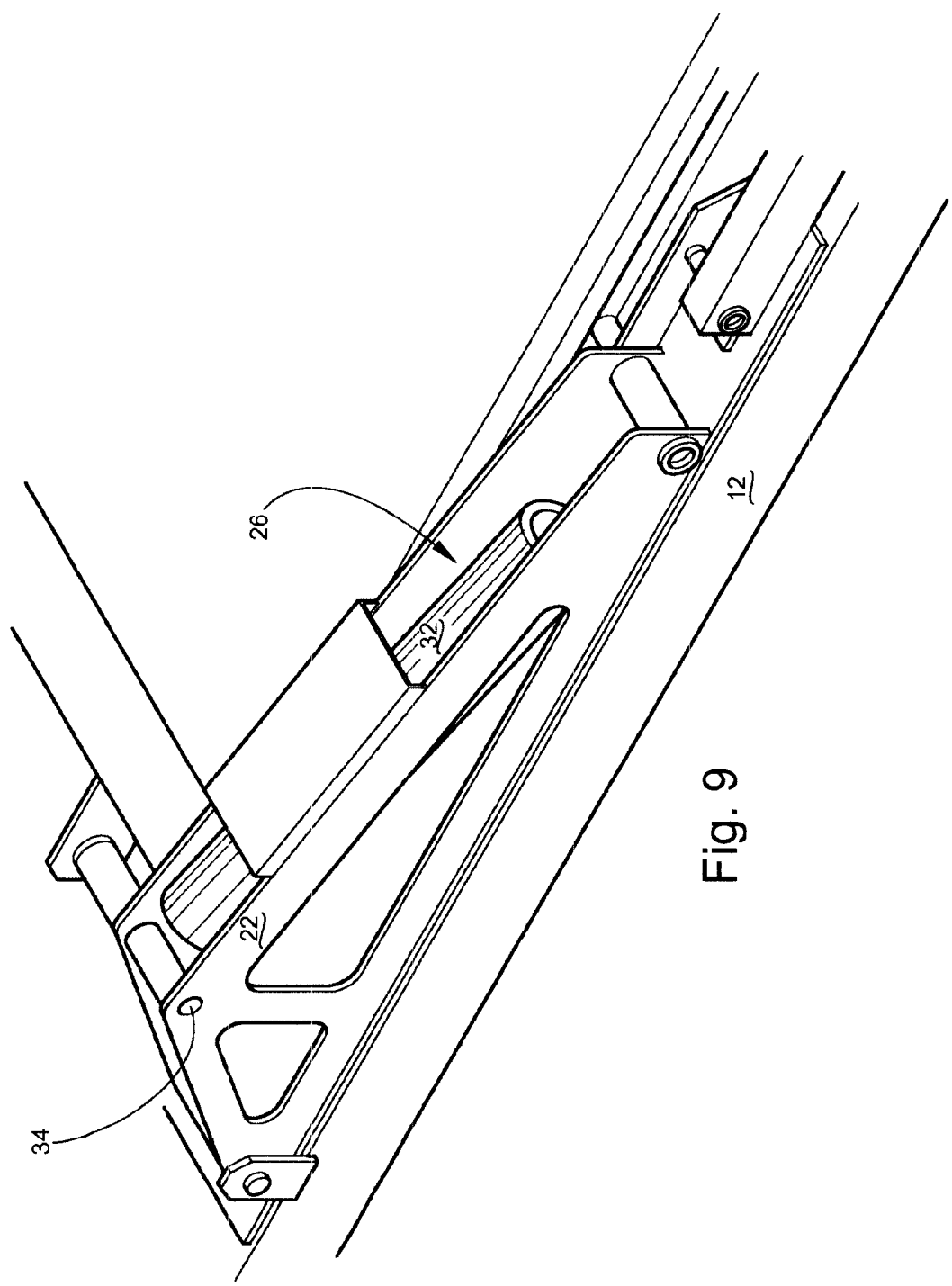
FIG. 9 is an isometric view of one of the forward legs and an associated cylinder shown in FIG. 7.
Figure 10:
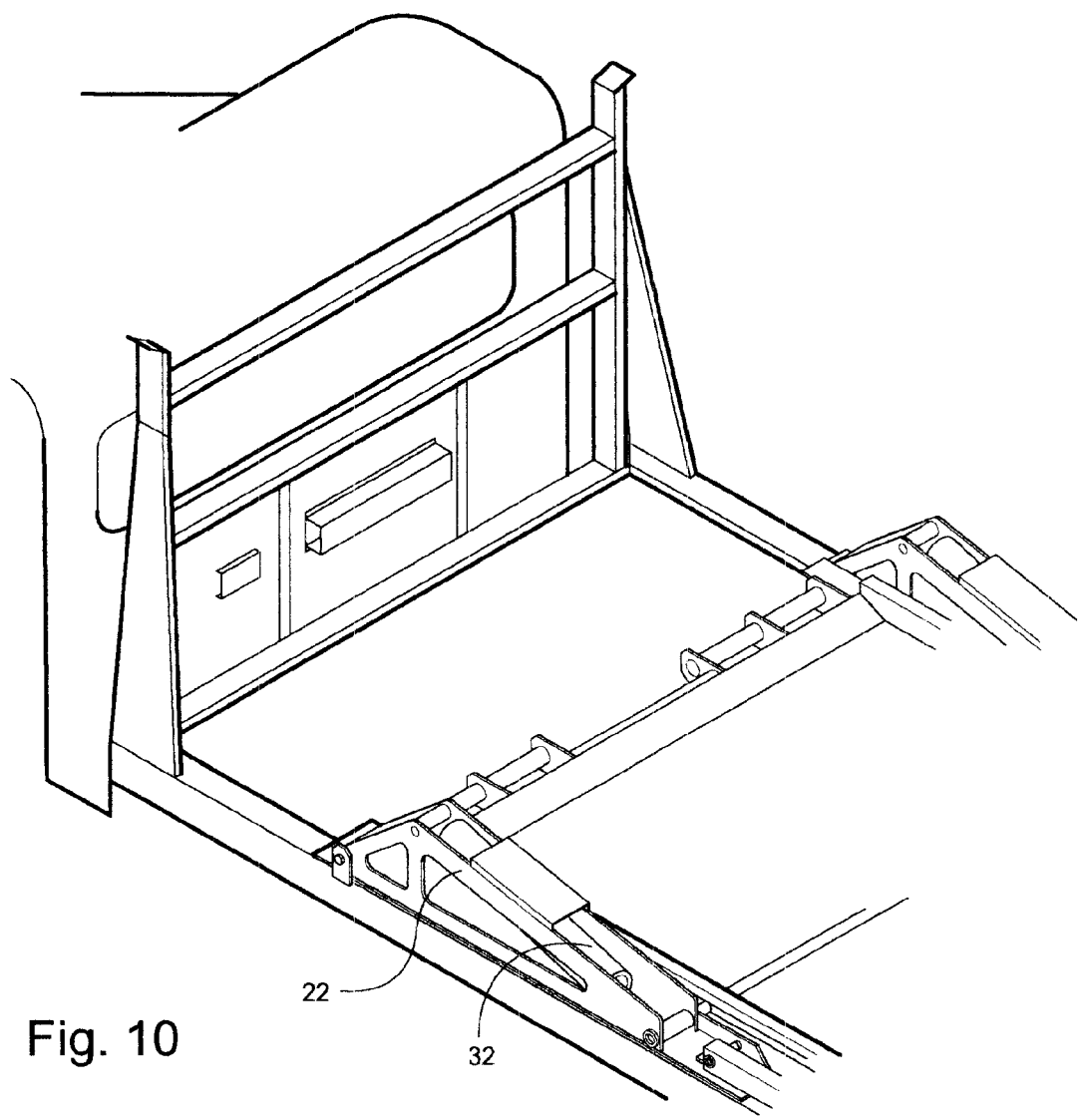
FIG. 10 is an isometric view of the forward legs positioned on the truck bed in the lowered position.
Figure 11:
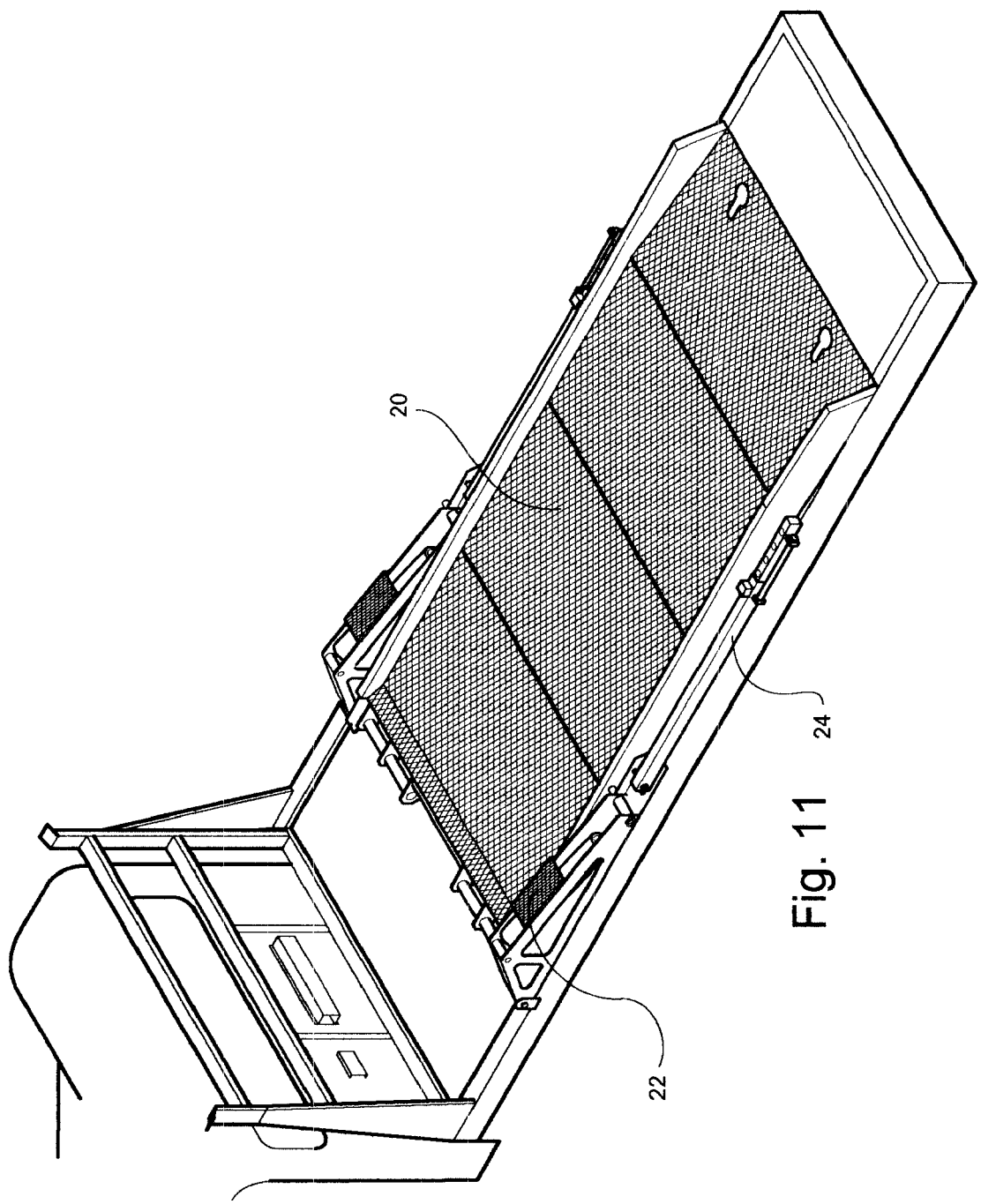
FIG. 11 is an isometric view of the receiving floor positioned on the truck bed.

Referring now to the drawings and particularly to FIG. 1, a loading, transporting and unloading device shown generally as 10 is secured to a slidable roll back bed 12 of a conventional hydraulic roll back truck 14. A supporting frame 16 (FIG. 8) rests on bed 12 of truck 14 and provides the support for receiving floor 20 and the associated structure subsequently to be described. Wheel engaging members 18 are adjustably secured to the front end of frame 16 as shown in FIG. 8.

Automobile-receiving floor 20 is shown in the raised position in FIG. 1, the floor being movably connected to bed 12 by forward and rearward support legs 22, 24. Members 22, 24 are pivotally connected to both bed 12 and floor 20 and are substantially of the same length so that their configuration during movement of floor 20 with respect to bed 12 will always result (when viewing legs 22, 24, bed 12 and floor 24 from the side of the truck) in a parallelogram. Maintaining this configuration throughout any movement keeps floor 20 substantially parallel with ramp 12 and level to insure carried vehicle stabilization.

Figure 4:
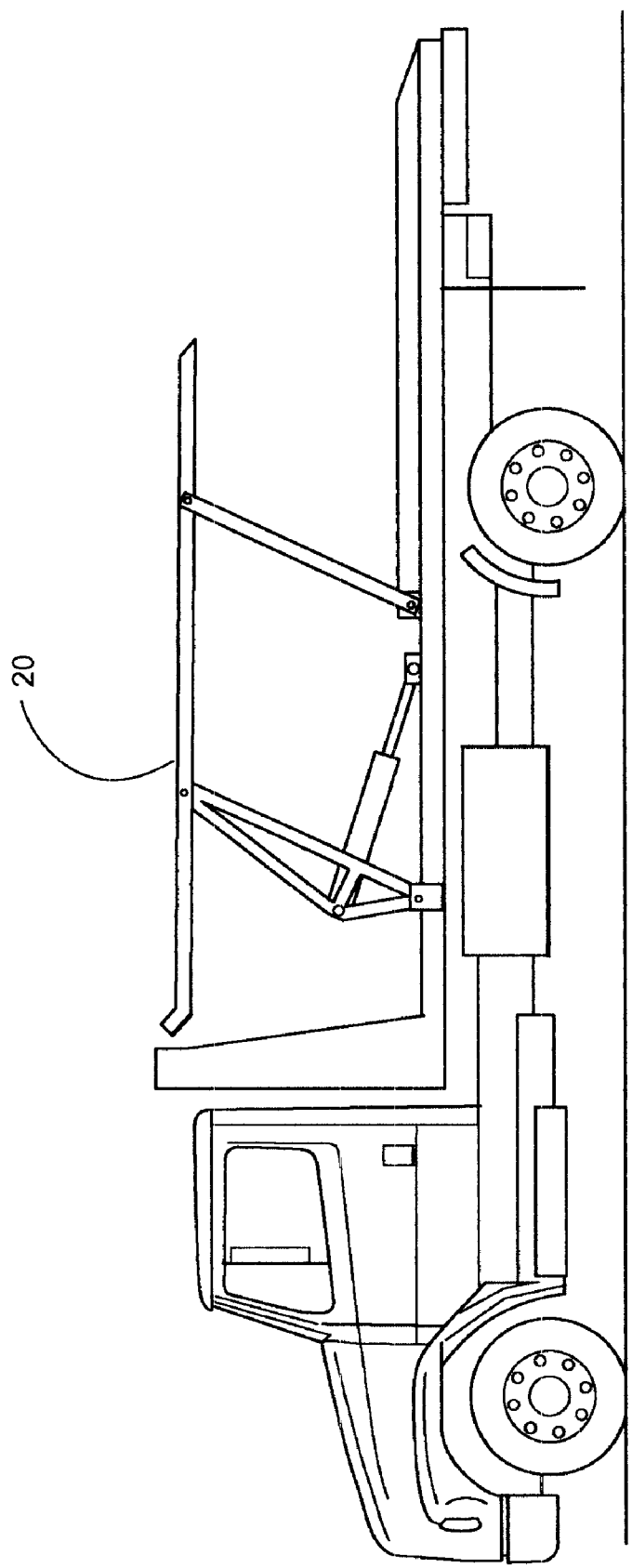
FIG. 4 is a perspective view of the device of the present invention with the receiving floor shown in a partially raised condition.
Figure 5:
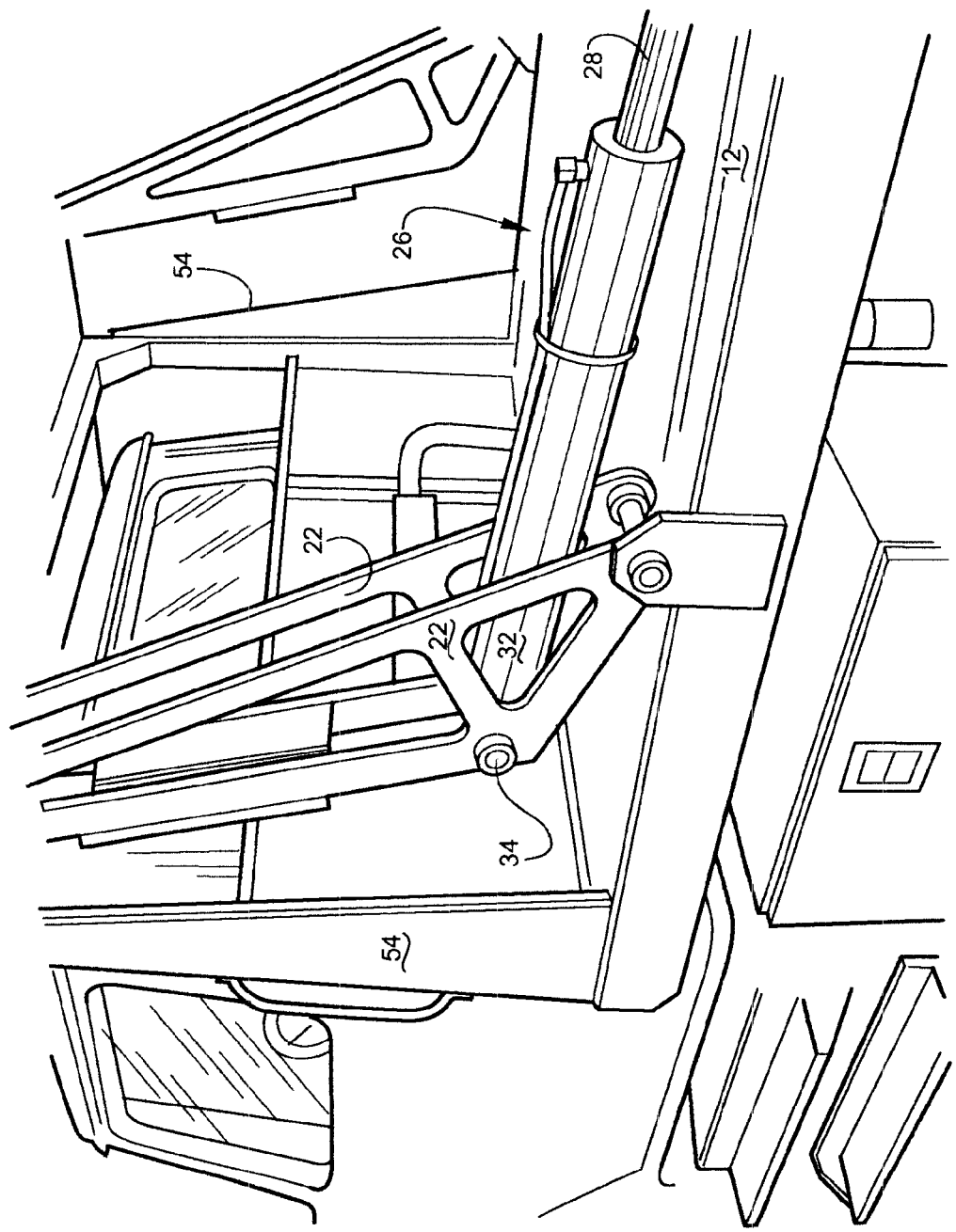
FIG. 5 is a fragmentary, perspective view of the device of the present invention with the receiving floor shown in the raised condition without cargo.
Figure 6:
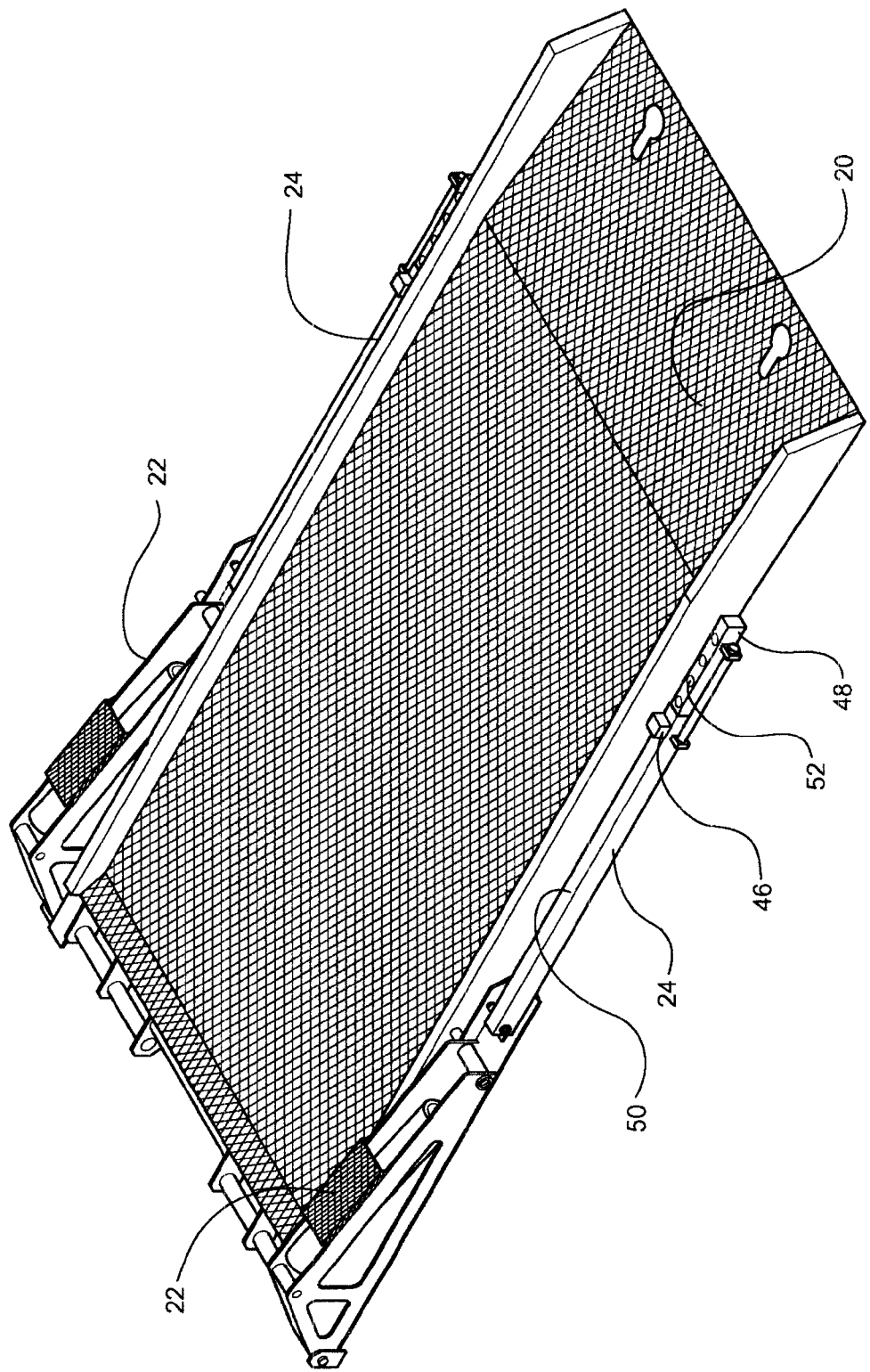
FIG. 6 is a perspective view of the device of the present invention showing the construction of the forward and rearward support legs and receiving floor in the inactive or lowered position.
Figure 7:
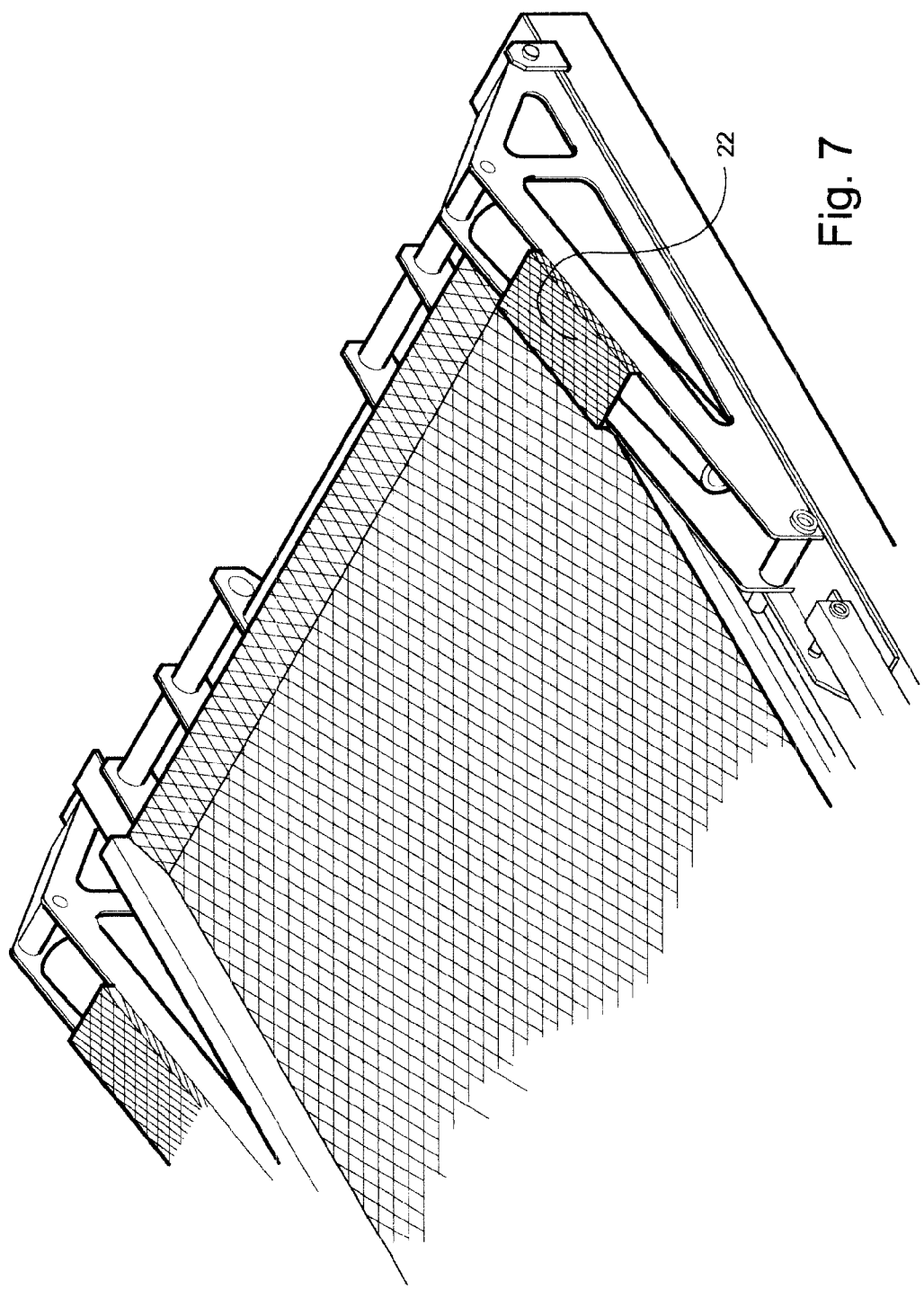
FIG. 7 is a perspective and fragmentary view of the forward support legs of the device removed from the truck and secured to the receiving floor.

Displacement of floor 20 is accomplished by power cylinders 26, one associated with each of the forward support legs 22. The engagement of cylinders 26 with legs 22 is best shown in FIG. 5 with one end 28 secured to truck bed 12 and the other end 32 secured to the angular protrusion 34 of the precisely designed forward support legs 22. When cylinders 26 are extended, forward support legs 22 and floor 20 are raised from their position adjacent bed 12 upwardly and forwardly (see partially raised position in FIG. 4) to the fully raised position as shown in FIGS. 1 and 5.

Figure 2:
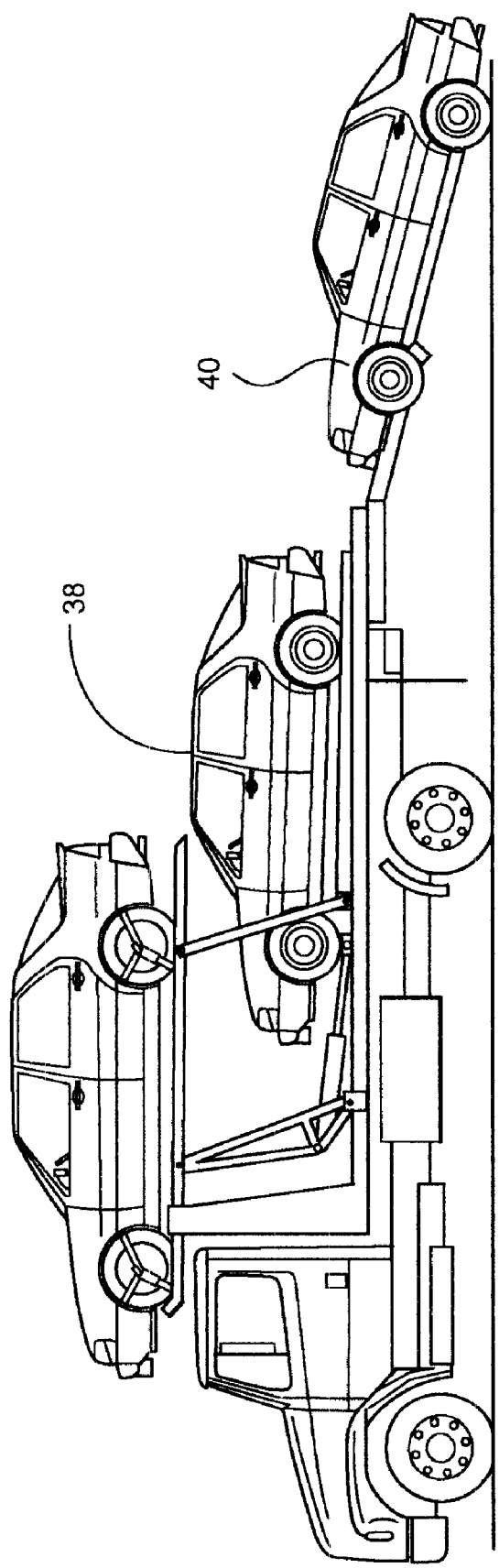
FIG. 2 is a side elevational and perspective view of the device of the present invention installed on a truck and associated with three automobiles to be transported.

As noted in FIG. 2, when floor 20 is loaded and elevated to the raised position, the vehicle weight carried by floor 20 is moved forwardly along the truck toward the front axle. This movement helps to evenly distribute the weight of the load over the vehicle and provides essential front end weight to give more maneuverability and stability to the truck.

Figure 3:
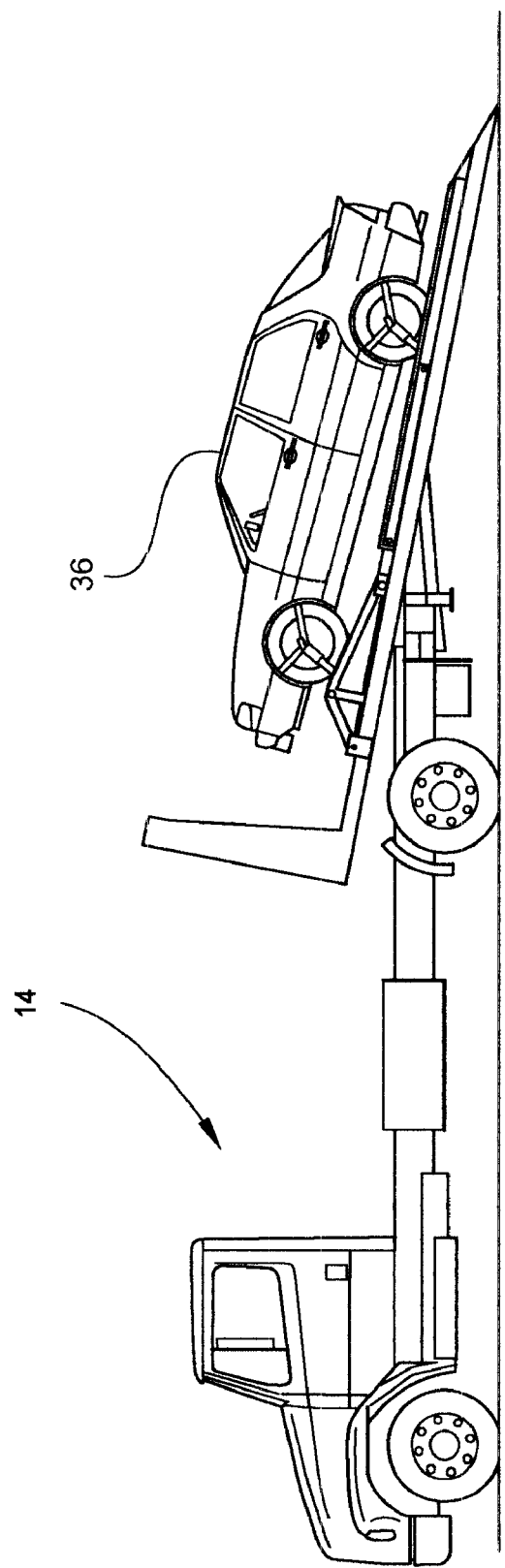
FIG. 3 is a perspective view of the device of the present invention in association with the truck wherein the truck bed has been rolled back and the receiving floor positioned to accommodate the placement of an automobile thereon.

In loading truck 14 to full capacity, bed 12 is displaced rearwardly and inclined downwardly as shown in FIG. 3. Floor 20 is in the lowered position adjacent bed 12. An automobile to be transported 36 is preferably winched up bed 12 and positioned on floor 20 as shown. There it is secured against movement, and floor 20 and carried automobile 36 are elevated by actuation of power pistons 26. Automobile 36 is raised while bed 12 is in the roll back or ground engaging condition.

Once vehicle 36 is secured and elevated to the raised position, a second vehicle 38 is placed on bed 12 beneath floor 20 and carried vehicle 36. There it is secured against movement and made ready for transport. As noted in FIG. 2, a third vehicle 40 can then be connected through a hitch mechanism 42 of conventional construction and towed by truck 14 thereby enabling the transport of three separate vehicles by one truck of the size and type described and shown.

The convenience of device 10 is that it can use hydraulic cylinders which, with the use of a switch valve, can be tied into the existing hydraulic system of the truck. The design of the device takes into account the space needed between bed 12 and floor 20 to accommodate the height of an automobile to be transported and yet enables the control of that height to accommodate all safety requirements needed for vehicle clearances and the like. For example, rearward support legs 24 can be height adjusted by removable pin 46 so that the tubular insert portion 48 can be moved within exterior portion 50 to select different heights of legs 24 and associated floor 20 by choosing a different aperture 52 to reinsert pin 46.

While various components such as forward and rearward support legs 22, 24 and pistons 26 are sized sufficiently to withstand considerably more weight than will ever be carried, additional strengthening structures are provided by the placement of upstanding power struts 54 positioned to protect the cab of the truck in the event something should occur and the floor 20 or legs 22, 24 should fail.

The size of the truck used to accommodate the present invention can vary, but a minimum of 19 feet for a rollback truck suitable for the present invention is desirable. In the event something longer than the minimum length truck is used, it is possible that two smaller cars can be accommodated for travel directly on bed 12 and under floor 20 thus enabling the total transportation of four vehicles by a single truck.

From the proceeding description, it can be seen that a loading, transporting and unloading device for vehicles with the use of a truck has been provided that will meet all of the advantages of prior art devices and offer additional advantages not heretofore available. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not intended to limit the invention to the exact construction and operation shown and described. All suitable modifications and equivalents that fall within the scope of the appended claims are deemed within the present inventive concept.

What is claimed is:

1. A loading and unloading device for transporting vehicles with the use of a truck comprising: a roll back bed having a front and rear end for movable attachment to the truck; a movable vehicle receiving floor positioned substantially parallel to and pivotally secured to the bed; and means pivotally secured to the bed and the floor for displacing the floor upwardly and downwardly while maintaining the floor substantially parallel to the bed.

2. The device as claimed in claim 1, the floor displacing means having forward support legs proximate the bed front end and rearward support legs positioned substantially midway between the bed front end and the bed rear end.

3. The device as claimed in claim 2 further including power cylinder means operably connected to the bed and the floor to selectively displace the floor to raised and lowered positions.

4. The device as claimed in claim 3 wherein the power cylinder means are one or more power cylinders connected to the floor forward of the rearward support legs.

5. The device as claimed in claim 1 wherein the configuration of the floor, the bed and the floor displacing means as the floor is selectively displaced to raised and lowered positions, is a parallelogram.

6. The device as claimed in claim 2 wherein the configuration of the floor, the bed and the support legs, as the floor is selectively displaced to raised and lowered positions, is a parallelogram.

7. The device as claimed in claim 3 wherein the configuration of the floor, the bed and the support legs, as the floor is selectively displaced to raised and lowered positions, is a parallelogram.

8. The device as claimed in claim 4 wherein the configuration of the floor, the bed and the support legs, as the floor is selectively displaced to raised and lowered positions, is a parallelogram.

9. A device for loading, transporting and unloading vehicles, the device comprising: a frame secured to the truck bed, the bed having front and rear ends and being movably attached to the truck; a movable vehicle-receiving floor positioned substantially parallel to and pivotally secured to the bed; and means pivotally secured to the bed and the floor for displacing the floor upwardly, forwardly and downwardly substantially parallel to the bed to raised and lowered positions, the floor being positioned in the raised position partially forwardly of the bed front end and to a height sufficient to accommodate the placement of a vehicle on the bed beneath the floor.

10. The device as claimed in claim 9, the floor displacing means having forward support members proximate the bed front end and rearward support legs substantially midway between the bed front end and the bed rear end.

11. The device as claimed in claim 10 further including power cylinder means operably connected to the bed and the floor to selectively displace the floor to raised and lowered positions.

12. The device as claimed in claim 11 wherein the power cylinder means are one or more power cylinders connected to the forward support members.

13. The device as claimed in claim 9 wherein the configuration of the floor, the bed and the floor displacing means, as the floor is selectively displaced to raised and lowered positions, is a parallelogram.

14. The device as claimed in claim 10 wherein the configuration of the floor, the bed and the support legs, as the floor is selectively displaced to raised and lowered positions, is a parallelogram.

15. A device for loading, transporting and unloading vehicles comprising: an automobile receiving floor movably secured to the bed, the bed being movably attached to the truck; means pivotally secured to the bed and the floor for displacing the floor upwardly, downwardly and substantially parallel to the bed to raised and lowered positions, the floor being positioned in the raised position partially forwardly of the bed front end and to a height sufficient to accommodate the placement of a vehicle on the bed beneath the floor.

16. A loading a unloading device for transporting vehicles with the use of a truck comprising: a roll back bed having a front and rear end movably attached to the truck for displacement from the truck from an inactive truck mounted position to an active truck dismounted position; a movable vehicle-receiving floor positioned substantially parallel to and movably secured to the bed; a pair of forward support legs and a pair of rearward support legs all pivotally secured to the bed and the floor for displacing the floor upwardly and downwardly substantially parallel to the bed to raised and lowered positions; power cylinders attached to the forward support legs and the floor to selectively displace the floor to raised and lowered positions; and floor height adjusting means formed in the rearward support legs including pin and aperture selective adjustment members.

* * * * *